United States Patent [19]

Arastoopour

[11] Patent Number: 5,704,555
[45] Date of Patent: *Jan. 6, 1998

[54] SINGLE-SCREW EXTRUDER FOR SOLID STATE SHEAR EXTRUSION PULVERIZATION AND METHOD

[75] Inventor: Hamid Arastoopour, Downers Grove, Ill.

[73] Assignee: Illinois Institute of Technology, Chicago, Ill.

[*] Notice: The term of this patent shall not extend beyond the expiration date of Pat. No. 5,395,055.

[21] Appl. No.: 440,727

[22] Filed: May 15, 1995

Related U.S. Application Data

[63] Continuation-in-part of Ser. No. 101,468, Aug. 2, 1993, Pat. No. 5,415,354.

[51] Int. Cl.⁶ .............................. B02C 19/22; B02C 23/18
[52] U.S. Cl. .................................. 241/16; 241/17; 241/18; 241/23; 241/60; 241/65; 241/260.1; 264/211.18; 425/204; 425/379.1
[58] Field of Search ................................. 241/16, 17, 18, 241/23, 60, 65, 260.1, 260; 264/211.18, 211.21; 425/204, 208, 379.1; 366/76.1, 79

[56] References Cited

U.S. PATENT DOCUMENTS

| | | |
|---|---|---|
| 2,910,726 | 11/1959 | Parshall et al. ............ 241/82.6 X |
| 3,102,716 | 9/1963 | Frenkel . |
| 3,104,420 | 9/1963 | Sellbach . |
| 3,164,375 | 1/1965 | Frenkel . |
| 3,525,124 | 8/1970 | Ocker . |
| 3,728,053 | 4/1973 | Stillhard et al. . |
| 3,814,566 | 6/1974 | Sharp . |
| 3,874,835 | 4/1975 | Rosater et al. . |
| 3,889,889 | 6/1975 | Sawa . |
| 4,041,115 | 8/1977 | Jenkins et al. . |
| 4,090,670 | 5/1978 | Bennett . |
| 4,098,463 | 7/1978 | Lowry . |
| 4,118,163 | 10/1978 | Lee . |
| 4,181,647 | 1/1980 | Beach . |
| 4,184,772 | 1/1980 | Meyer . |
| 4,367,190 | 1/1983 | Buch . |

(List continued on next page.)

FOREIGN PATENT DOCUMENTS

| | | |
|---|---|---|
| 9114552 | 10/1991 | European Pat. Off. . |
| 2196242 | 3/1974 | France . |
| 3332629 | 3/1985 | Germany . |
| 4021550 | 1/1991 | Germany . |
| 4128630 | 7/1992 | Germany . |
| 4130315 | 1/1993 | Germany . |
| 334404 | 1/1959 | Switzerland . |
| 456937 | 7/1968 | Switzerland . |
| 1184717 | 3/1970 | United Kingdom . |

OTHER PUBLICATIONS

Translation PTO 97–930 of German patent 4130315, Jan. 1993.

Japanese Patent Abstract, Pub. No. JP62117705, vol. 336 (M–638), Pub. Date 29 May 1987.

Japanese Patent Abstract, Pub. No. JP05124039, vol. 17, No. 493 (M–1475), Pub. Date 21 May 1993.

Nikoli S. Enikolopian, "Some Aspects of Chemistry and Physics of Plastic Flow", Pure & Appl. Chem., vol. 57, No. 11, pp. 1707–1711, (1985).

Amer. Inst. Chem. Engrs; 1992 Annual Meeting, Nov. 1–6, 1992 Thermoplastic Waste Recycling Process Using Solid State Shear Extrus. Extended Abstracts, p. 441, Abstract No. 187e.

*Primary Examiner*—Timothy V. Eley
*Attorney, Agent, or Firm*—Speckman, Pauley & Fejer

[57] ABSTRACT

A process and apparatus for single screw solid state shear extrusion pulverization of polymeric materials in which the polymeric materials are heated to a temperature suitable for forming a continuous thin film of said polymeric material, and then cooled, and normal and shear forces sufficient to form powder of the polymeric material are applied by a single cylindrical or conical mesh screw. The resulting powder is fluidized upon its discharge.

26 Claims, 3 Drawing Sheets

U.S. PATENT DOCUMENTS

| | | |
|---|---|---|
| 4,408,888 | 10/1983 | Hanslik . |
| 4,511,091 | 4/1985 | Vasco . |
| 4,607,796 | 8/1986 | Enikolopov et al. . |
| 4,607,797 | 8/1986 | Enikolopow et al. . |
| 4,650,126 | 3/1987 | Feder et al. . |
| 4,708,617 | 11/1987 | Herrington . |
| 4,716,000 | 12/1987 | Kerschbaum et al. . |
| 4,875,847 | 10/1989 | Wenger et al. . |
| 4,890,996 | 1/1990 | Shimizu . |
| 4,968,463 | 11/1990 | Levasseur . |
| 4,997,131 | 3/1991 | Talonen . |
| 5,026,512 | 6/1991 | Chang . |
| 5,073,320 | 12/1991 | Stezel . |
| 5,088,914 | 2/1992 | Brambrlla . |
| 5,273,419 | 12/1993 | Mayer et al. ............................ 425/204 |
| 5,395,055 | 3/1995 | Shutov et al. ............................ 241/16 |
| 5,397,065 | 3/1995 | Shutov et al. ............................ 241/16 |
| 5,415,354 | 5/1995 | Shutov et al. ............................ 241/16 |

| FEEDING | HEATING | COOLING / POWDERIZATION | FLUID- IZING |
|---------|---------|-------------------------|--------------|
| ZONE (1) | ZONE (2) | ZONE (3) | ZONE (4) |

| FEEDING | HEATING | COOLING/POWDERIZATION | FLUIDIZING |
|---------|---------|----------------------|------------|
| ZONE (1) | ZONE (2) | ZONE (3) | ZONE (4) |

SINGLE-SCREW EXTRUDER FOR SOLID STATE SHEAR EXTRUSION PULVERIZATION AND METHOD

CROSS-REFERENCE TO RELATED APPLICATION

This application is a continuation-in-part application of application Ser. No. 08/101,468, filed 2 Aug. 1993, now U.S. Pat. No. 5,415,354 issued 16 May 1995.

BACKGROUND OF THE INVENTION

1. Field of the Invention

This invention relates to a solid state shear extrusion apparatus and process for continuous pulverization to fine particles of a wide variety of solids and their mixtures, such as, polymers, copolymers, homopolymers, agrowastes, rubber, wood chips, and mixtures of synthetic and natural polymers which have been resistant to such fine pulverization. The process and apparatus of this invention are especially useful for recycling of synthetic and natural polymers and mixed polymers wastes using a non-cryogenic and low power consumption technique.

2. Description of Prior Art

Currently, three basic reclaiming processes of virgin and used plastics are practiced: chemical, which include pyrolysis, hydrolysis, and incineration; thermal, which, for example, include extrusion, injection molding, and pressure molding; and mechanical, which include granulation, densification, agglomeration and pulverization. The disadvantages of presently used processes include high energy consumption, a decrease in the original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize, followed by removal of the devulcanized material, for example, by rasping. This method is limited to rubber and does not produce fine powers as desired for many reuse applications.

Reclamation of thermal plastic materials, including shredding, grinding and comminuting, is exemplified by: U.S. Pat. No. 4,968,463 which teaches shredding waste plastic to about 100 millimeters and grinding to under about 40 millimeters, followed by drying, preheating to 80° to 160° C., kneading at 120°to 200° C., and injection molding or extrusion; U.S. Pat. No. 4,650,126 which teaches heating plastic particles to melt the surface to retain a grinding aid thereon and maintaining a counter-rotating attrition mill at a temperature to retain nearly all of the grinding aid on the softened polymer particles during grinding, followed by an air stream which serves to separate the grinding aid and as a material carrier medium; U.S. Pat. No. 4,511,091 which teaches thermal plastic scrap recovery in combination with phonograph record pressing wherein the hot trimmed waste is cooled, ground, and mixed with virgin material for formation of phonograph records; and U.S. Pat. No. 4,098,463 which teaches a liquid cooling spray to maintain the temperature in a cutting chamber such that the plastic is hard, thereby reducing the fibers embedded in the comminuted particles from plastic, electrical or telephone cord insulation.

Various screw devices are known for conveyance and processing of materials in the synthetic polymer industry. U.S. Pat. No. 5,026,512 teaches molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point with the maximum temperature being at the outlet. U.S. Pat. No. 4,890,996 teaches continuous granulating by melting, kneading and granulating macromolecules wherein a double screw header without lateral communication is capable of adjusting the degree to which material is kneaded by axial adjustment of the cylinders and screws with respect to each other.

Conical screw sections are known to be used for specific purposes. For example, U.S. Pat. No. 4,875,847 teaches a twin screw extruder, especially suited for viscous materials, having frusto-conical screw sections and separate barrel sections at the outlet end providing bearing-type support for the separate screws. An extracting apparatus having screw-threaded shafts rotatable within a housing and having conveying and milling sections with an obstruction section between them for pressure sealing is taught by U.S. Pat. No. 3,525,124. The screw and housing may be tapered to form the obstruction section, thereby providing independent heat and pressure control in the conveying and milling sections.

Chemical and physical aspects of transformations of polymeric materials, such as pulverization, under simultaneous high pressure and shear is described in Enikolopian, N. S., "Some Aspects of Chemistry and Physics of Plastic Flow", *Pure & Applied Chemistry*, Vol. 57, No. 11, pp. 1707–1711 (1985).

U.S. Pat. No. 4,607,797 teaches pulverization of fused polymers in an extrusion apparatus having a barrel with at least one cylindrical rotatable screw. When two screws are used, they are co-rotational. The '797 patent teaches that material is fed to one end of the barrel, heated to above its fusing temperature in a first zone, cooled to below its solidification temperature with simultaneous pre-crushing and pulverizing of the solidified material in a second zone, followed by discharge of the powdered material from the opposite end of the barrel. Screw action is used to convey the material through the barrel and substantially elliptical or triangular kneading or pulverizing discs non-rotatably mounted on the screw in the cooling zone provide the pre-crushing and pulverizing. The process is carried out at 0.25 to 0.30 MPa. This process is said to continuously produce particles having a very uniform grain size, in the case of polyethylene, only 2% larger than 160 microns. The '797 patent distinguishes its process from the prior art by allowing solidification of the fused material within the extrusion apparatus.

U.S. Pat. No. 4,607,796 teaches pulverization of rubber and vulcanization products in a standard single- or multiple-screw extruder by compressing at a pressure of 0.2 to 0.7 MPa followed by subjecting the compressed material to a shear force of 0.03 to 5N/mm$^2$ at a pressure of 0.2 to 50 MPa and a temperature of 80° to 250° C., forming hot sheared material which is subjected to a shearing force of 0.03 to 5N/mm$^2$ at a pressure of 0.2 to 50 MPa and a temperature of 15° to 60° C., forming cooled powder material. Addition of granulated polyethylene to butyl rubbers is necessary to obtain finely dispersed powders. This process is said to result in particles not exceeding 500 micrometers in the case of natural rubber and 300 micrometers with other rubbers.

SUMMARY OF THE INVENTION

Natural and synthetic polymer wastes are increasing and environmental concerns about their disposition render recycling necessary. However, many reclamation processes to date have been limited to certain types of wastes and particularly limited with respect to mixed wastes, have been uneconomical, particularly with respect to energy consumption, and have not provided reclaimed material in a formed conducive to reuse manufacturing. Solid state shear extrusion pulverization according to this invention requires low energy input, about one-fifth the energy required as presently used by cryogenic pulverization, and provided finer and more uniform powders which may be used in a broader range of reuse or end use manufacture, than presently known pulverization techniques.

It is one object of this invention to provide a low cost apparatus and low energy consumption process and apparatus for pulverization of polymeric materials to fine powders.

It is another object of this invention to provide a process and apparatus for pulverization of a wide variety of natural and synthetic polymeric materials to form a fine powder.

It is yet another object of this invention to provide a process and apparatus suitable for economical recycling of a wide variety of natural and synthetic polymer wastes, including mixed wastes, by solid state shear extrusion pulverization of such waste materials, forming fine powders suitable for use in new product production.

Still another object of this invention is to provide fine polymeric particles for coating and preservation of stone and concretes, such as used in monuments, building, and bridges, and concrete pipes and materials exposed to corrosive environments. The object is to provide a substitute for liquid paints and coatings based upon organic non-environmentally friendly solvents with fine particle coatings which are more durable, stable and environmentally safe when applied to surfaces, especially metal and porous mineral surfaces.

It is another object of this invention to provide a process and apparatus to enhance reactivity of polymeric and solid monomeric materials in the formation of homopolymers, copolymers and polymeric materials not achievable by prior methods of reaction.

It is yet another object of this invention to provide a screw for a single screw solid state shear extrusion pulverization apparatus in order to increase the amount of smaller particles produced without formation of large agglomerates or sinters at lower cost than twin screw extruders.

These and other objects of this invention are achieved by slightly heating thermosetting materials and elastomers to desired temperatures and heating thermoplastic materials to a softening or pre-melt temperature below their melting point, then cooling the material and applying high normal and shear forces sufficient to form fine powder of the polymeric material and fluidizing the fine powder with further cooling in a gas stream, thereby preventing its agglomeration in materials having tendency to agglomerate. In accordance with a preferred embodiment of this invention, said normal and shear forces sufficient to form a powder of said polymeric material are applied by one of a cylindrical and a conical mesh single screw solid state shear extrusion pulverizer. The heat applied to the material decreases the physical bonds between macromolecules and enhances mechanical deformations. Suitable forces may be applied by application of torque up to about 20 MKg and pressure up to about 100 psig. Fine powders having particles sized about 5 to about 800 microns have been produced by the single-pass process of this invention. The volume average range is about 50 to about 200 microns.

The process of this invention is carried out on a continuous basis in a solid state shear extrusion pulverizer comprising a hollow elongated barrel with a material feed end and a powder discharge end, which hollow elongated barrel houses a single screw extruder. Feed means are provided for feeding the polymeric material to a first zone at the feed end of the hollow elongated barrel and discharge means for discharging a pulverized powder from a fourth zone are provided at the discharge end of the hollow elongated barrel. Heating means for heating the polymeric material to a pre-melt or softening temperature below its melting temperature are provided in a second zone adjacent to the first zone. Cooling means for cooling the polymeric material from the pre-melt temperature to a lower temperature are also provided toward a downstream end of said second zone. Means for applying normal and shear forces sufficient to form fine powder from the polymeric material are provided in a third zone disposed between the second zone and fourth zone. Finally, means for fluidizing the powder in a gas stream in at least one of the third zone and the fourth zone are also provided, thereby preventing agglomeration of the powdered polymeric materials.

Suitable pre-melt or softening temperatures are those at which the thermoplastic material is softened and can be shaped by the extruder, but not melted. For thermosetting materials or elastomers, the temperature is adjusted to enhance shaping of the polymer by the extruder. These temperatures depend upon the polymeric materials used and are readily ascertained by one skilled in the art. For most polymeric materials, heating to about 100° to 200° C. and below the melting point of the polymer is suitable. The temperature to which the material is cooled in the third zone is again dependent upon the polymeric materials used and is readily ascertainable by one skilled in the art. For most polymeric materials, cooling to about 30° to about 80° C. is suitable. To promote non-agglomeration of the powders produced in the third and fourth zone, in accordance with one embodiment of this invention, the barrel diameter is increased as is the distance between the screw flights in the fourth zone.

Said means for applying high normal and shear forces sufficient to form fine powders, in accordance with one embodiment of this invention, comprises a screw disposed within said hollow elongated barrel, said screw comprising a first screw section having flight and mesh sizes suitable for conveyance of the polymeric material in the first zone into the third zone and comprising a second screw section in which the flights and mesh change place, the second screw section disposed in the third zone.

The solid state shear extrusion pulverization process and apparatus of this invention provides continuous very fine pulverization, to an average particle size of less than about 100 microns on polymeric materials which have been recalcitrant to fine pulverization by prior processes and apparatuses. The process of the invention utilizes a single screw, which is significantly lower in cost and easier to operate than twin screws, and temperatures closer to ambient than prior processes with the major amount of supplied energy to the process being utilized to create normal and shear stresses on the particles to result in the very fine powder with low energy input. A significant amount of the energy required for pulverization of the polymeric materials to very fine powder is produced by creating thin film and cooling this film, resulting in very high shear and normal stresses by the "Bridgeman" effect. The process and apparatus of this invention are applicable to a variety of thermoplastic and thermosetting polymers and elastomers, such as, low density polyethylene, rubber, mixtures of low density polyethylene and rubber, and low density polyethylene and wood, low and high density polyurethane, cross-linked polyethylene foam, and copolymers. The fine polymeric powder produced by the process and apparatus of this invention enables much broader end uses in the textile and coating industries and as fillers and reinforcement agents in many types of matrices such as polymers, ceramic, gypsum, concrete, and asphalt. This is important to practical utilization of products of recycling polymer waste, both pre- and/or post-consumer, to reduce the environmental problems caused by such solid wastes.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

In the process of solid state shear extrusion pulverization in accordance with this invention, polymeric granules, flakes or shreds of virgin or used synthetic or natural polymer, copolymer and homopolymer materials, or a mixture of such materials, are fed by any suitable feed means to a first zone at the large end of a hollow generally converging barrel housing a generally converging single screw extruder having one generally converging screw. By the terminology "generally converging", it is meant that the cross section of the feed ends of the barrel are larger than the cross section of the opposite discharge ends and in the powder formation zone, the convergence is continuous, forming a conical screw in at least that zone. This terminology is intended to allow a large shaped end section and small central sections, for example, to accommodate bearing means. Generally, the screw may be cylindrical in the feed zone, have a definite conical convergence in the powder formation zone, and provide an expansion cross sectional area in the fourth or fluidizing zone. In accordance with preferred embodiments, a continuously converging conical screw is employed for the entire length of a barrel having converging walls in the powderization zone followed by diverging walls in the fluidization zone.

Figure 1:
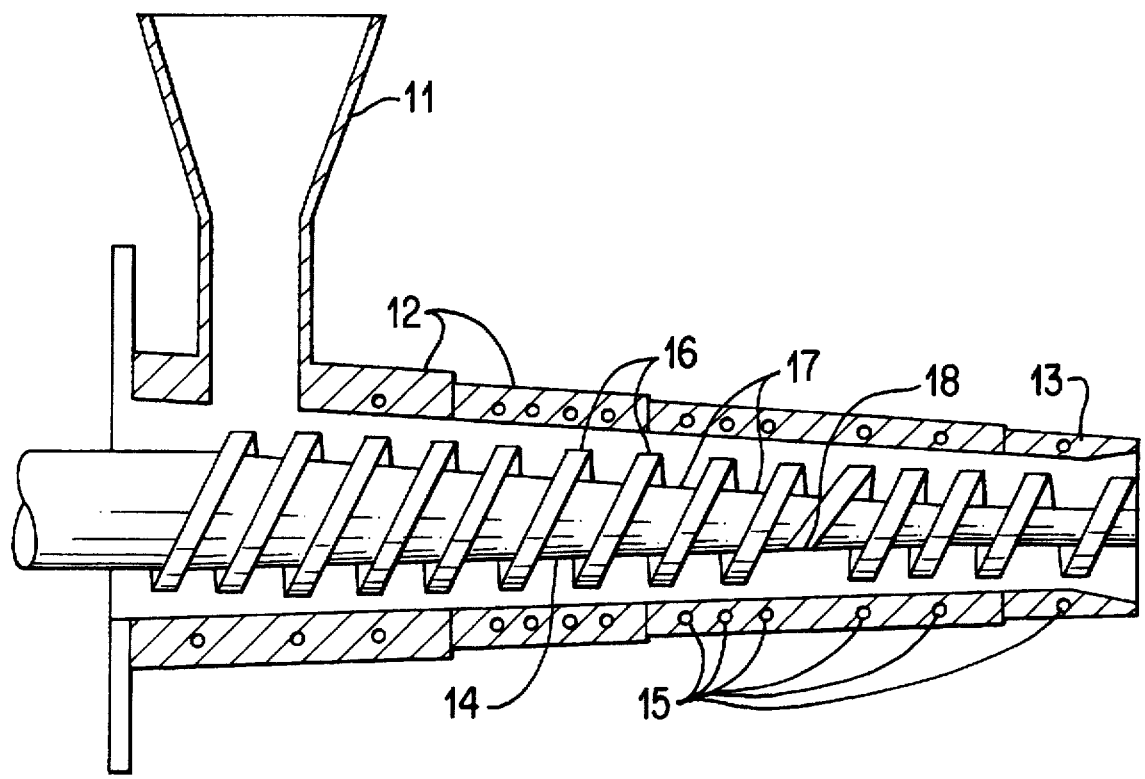
FIG. 1 is a longitudinal sectional view showing four zones on a conical, single screw apparatus in accordance with one embodiment of this invention.

FIG. 1 is a longitudinal sectional view of an apparatus according to one embodiment of this invention showing feed hopper 11 for feeding polymeric materials to feeding zone 1 within hollow elongated barrel 13, hollow elongated barrel 13 housing a single screw 14. Heaters 12 are provided in the barrel walls in the region of heating zone 2. Cooling conduits 15 are provided in the barrel walls in the region of cooling/powderization zone 3 and are also provided in the region of fluidizing zone 4. To promote the non-agglomeration of particles produced in the cooling/powderization zone 3, the inside diameter of hollow elongated barrel 13 is shown increasing in fluidizing zone 4. In addition, an increase in the spacing of the flights 16 on screw 14 in fluidizing zone 4 is also shown.

In accordance with the embodiment shown in FIG. 1, screw 14 comprises a plurality of flights (external threads) 16 and mesh (internal threads) 17. In general, screw 14 may comprise equal or unequal size flights 16 and mesh 17. The screw section in feeding zone 1 and heating zone 2 require flight and mesh sizes suitable for conveyance of the polymeric material in the feeding zone 1 into the cooling/powderization zone 3. That is, this first section of screw 14 must be capable of feeding the unit and conveying a continuous thin film through the clearance between flights 16 of screw 14 and the inside surface of hollow elongated barrel 13 while conveying thicker films between the clearance between the mesh 17 and the internal surface of hollow elongated barrel 13. Although shown in FIGS. 1 and 2 as having a smooth surface, it will be apparent to those skilled in the art that the internal surface of hollow elongated barrel 13 may be rough, resulting in the introduction of significant frictional forces at the internal surface.

In the cooling/powderization zone 3, the flight 16 and mesh 17 are designed in such a way that they gradually change places, this changeover designated-by reference numeral 18. As a result of changeover 18, the pulverized materials that have been conveyed on the external threads or flights 16 slide along the diameter of screw 14 and move to internal threads or mesh 17 where they are subsequently conveyed to fluidizing zone 4. At the opposite side of the screw in the region of changeover 18, the materials which up to the point of changeover 18 have been conveyed by screw 14 on the top of mesh or internal threads 17, move toward the walls are then pulverized in the thin clearance between the flights 16 of screw 14 and the interior wall of hollow elongated barrel 13 in the downstream portion of cooling/powderization zone 3 before entering fluidizing zone 4.

The polymeric feed material may be fed to feeding zone 1 in a size range equal to or less than the distance between flights 16 and their depths, preferably about 1 millimeter to about 6 millimeters. Size reduction to these dimensions may be achieved by many methods known to those skilled in the art. Suitable polymeric materials include polyethylene terephthalate, high-density polyethylene, low-density polyethylene, polypropylene, polyvinyl chloride, styrenes, acrylics, polycarbonates, polyamides, polyurethanes, rubber, and natural polymers, such as wood and corn and cross-linked polymers. Mixtures of composites of these materials may be used. When materials recalcitrant to fine pulverization are present alone, it is desirable to form a mixture of such materials with at least one material which is readily pulverized to the desired fine particles by the process of this invention. Minor amounts of readily pulverized materials, about 5 to about 50 volume percent, depending greatly upon the materials, may be mixed with such recalcitrant materials to produce fine powder formation according to this invention. To accommodate recycling of waste polymeric materials, it may be desirable to have present minor amounts, up to about 30 volume percent, of pulverizable materials.

Heating means capable of heating the polymeric material in heating zone 2 to a softening or pre-melt temperature which is below its melting point for thermoplastic materials, and to desired temperatures for thermosetting materials and elastomers, are located in a suitable manner to achieve the desired temperatures, at which a small shear stress may result in high deformation. Any suitable heating means known to the art may be used, for example, hollow elongated barrel 13 may be electrically heated or a fluid heating jacket surrounding hollow elongated barrel 13 may be used in heating zone 2. In heating zone 2, where heating takes places, screw 14 serves primarily to convey the material through heating zone 2 with an appropriate residence time to achieve the desired heating prior to entry to an adjacent cooling/powderization zone 3.

Cooling means capable of cooling the pre-melt, thermoplastic polymeric material or thermosetting polymers and elastomers in cooling/powderization zone 3 to a temperature, such that the polymers behave as in a solid state, are located in a suitable manner to achieve the desired temperature. Any suitable cooling means known to those skilled in the art may be used, for example, a fluid cooling jacket surrounding the barrel, liquid nitrogen, dry ice, or the like. In the upstream portion of the length of cooling/powderization zone 3 where cooling of the material from the higher temperature occurs, screw 14 serves primarily to convey and pulverize material within this region at an appropriate residence time to achieve the desired cooling. Cooling in cooling/powderization zone 3 forms thin solid film material and imparts very high normal and shear stresses in the thin film material. High shear force initiate formation of microfractures and high normal force results in higher friction which prevents the separation of the layers of polymeric material and, in turn, storage of significant amount of energy and, at the same time, a growing number of microfractures, until storage of energy reaches critical values and frictional forces are no longer able to hold the material with significant microfractures in a continuous state and catastrophic pulverization occurs. Concurrently with formation of these high normal and shear stresses in the material in cooling/powderization zone 3, and in adjacent fluidizing zone 4, it is preferred that the meshing screw be shaped to provide additional normal and shear stresses to the material sufficient to form fine powder. In preferred embodiments, the average fine particle sizes are less than about 200 microns.

Uniform powderization of the material is enhanced as a result of the changeover 18 in cooling/powderization zone 3.

The very fine powder produced in cooling/powderization zone 3 is passed to fluidizing zone 4 where the cross sectional open area of hollow elongated barrel 13 is expanded and gas sufficient to fluidize the powder to prevent agglomeration and to convey the powder through a discharge means in fluidizing zone 4 is introduced. Any gas which is not chemically reactive with the powder material may be used as a fluidizing gas. Air at ambient temperature is a preferred fluidizing gas which additionally cools the powder. The fluidizing gas may be introduced to hollow elongated barrel 13 in cooling/powderization zone 3 and fluidizing zone 4 by any suitable method known to those skilled in the art. The cross sectional open area may be suitably expanded by reduction of the cross sectional area of screw 14, by increasing the distance between flights 16 of screw 14 or by reduction of the taper or actual divergence of hollow elongated barrel 13. The fluidized very fine powder may be discharged from a suitable opening in hollow elongated barrel 13.

The aspect of this invention relating to fluidizing pulverized powder in a gas stream following pulverization to prevent its agglomeration is applicable to any process for solid state pulverization by shear extrusion. The fluidizing is carried out in an expanding volume which may be provided by a diverging chamber and by providing larger distances between flights 16 of screw 14 passing through fluidizing zone 4. It is further desired that the fluidized powder is cooled in an expanding volume zone. These features aid in expanding the powder from a packed bed condition to a fluidized bed condition, releasing forces from the contacting particles and basically floating them, significantly preventing agglomeration.

Figure 2:
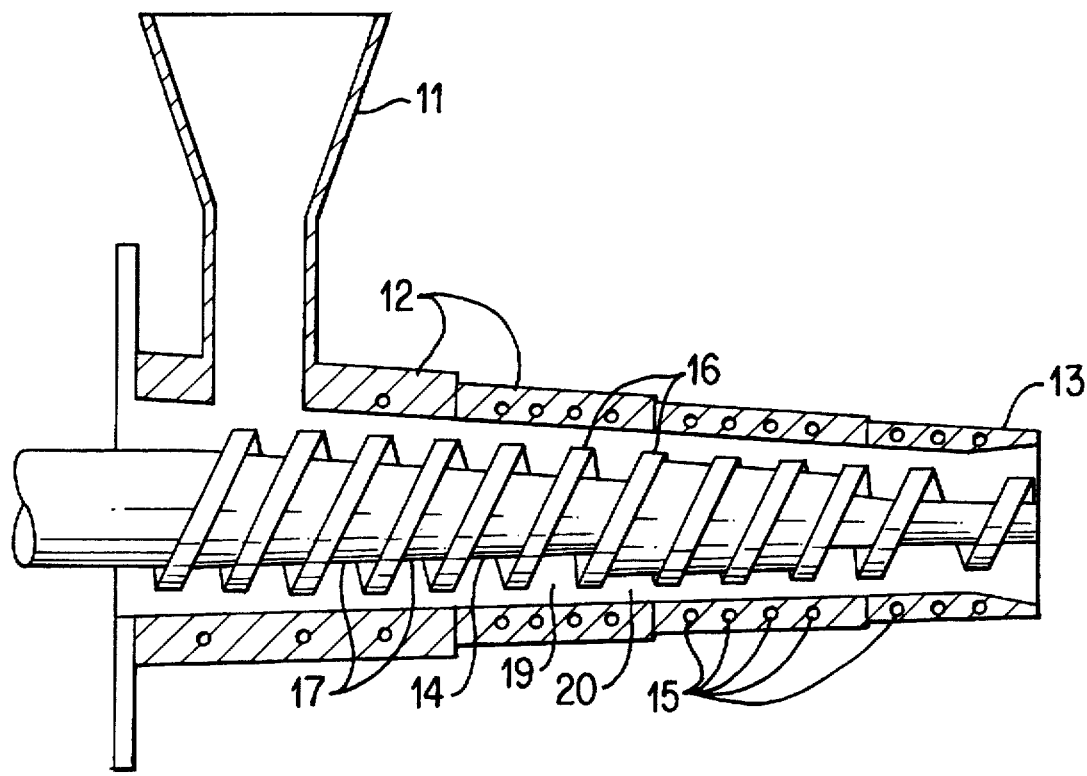
FIG. 2 is a longitudinal sectional view showing four zones of a conical, single screw apparatus in accordance with another embodiment of this invention.
Figure 3:
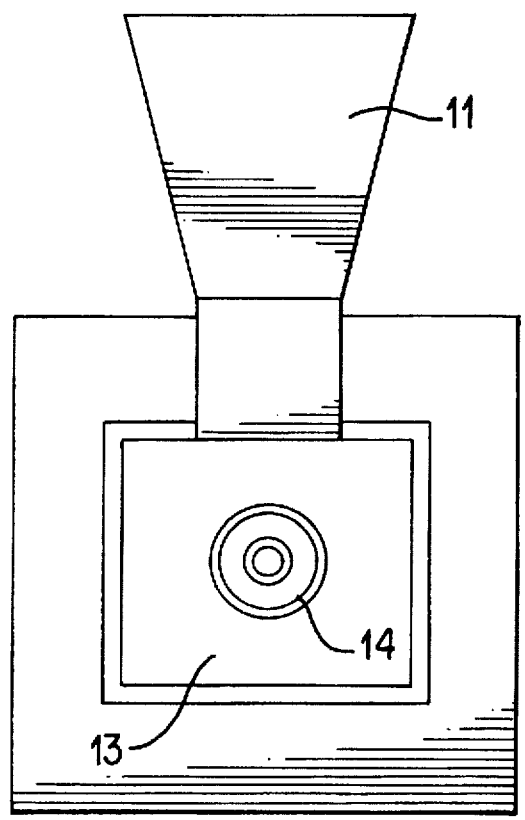
FIG. 3 is an end view of the apparatus shown in FIGS. 1 and 2.

FIG. 2 shows a longitudinal sectional view of an apparatus for single-screw solid state shear extrusion pulverization of polymeric materials in accordance with another embodiment of this invention. As in the embodiment shown in FIG. 1, the design of screw 14 in feeding zone 1 and heating zone 2 may be any design suitable for feeding the apparatus and conveying continuously the thin film of softened polymeric material to cooling/powderization zone 3. In cooling/powderization zone 3 in accordance with this embodiment of the invention, the screw design is such that the clearance 20 between internal thread 17 of screw 14 and the interior surface of hollow elongated barrel 13 is much smaller than the corresponding clearance 19 in feeding zone 1 and heating zone 2. The decrease in the clearance between internal thread 17 of the screw 14 and the interior surface of hollow elongated barrel 13 may be rather sharp which occurs in the lower portion of the heating zone and beginning of the cooling zone, or it may be smooth throughout all three zones (feeding, heating, and cooling/pulverization). This clearance must be sufficiently small to cause the significant frictional force needed for pulverization under high shear forces. A significantly low clearance between the internal thread and the interior surface of the barrel results in the conveyance of thinner polymeric materials through the cooling/powderization zone. This (modified clearance height) results in significantly higher normal force exerted on the thin film of polymers and thus very high friction force which (strongly) resists the separation of layers of materials under high shear forces. This (high frictional force) in turn results in a continuous increase in the stored energy and, at the same time, the number of non-separated microfractures also increases significantly until the frictional force is no longer able to hold the material containing a significant number of microfractures in a continuous state and catastrophic pulverization occurs. A sufficiently low clearance which results in higher friction causes the production of very small particles with an insignificant percentage of larger particles (e.g., greater than 500 microns) and therefore there is no need for reprocessing. At the same time, clearance 20 must be slightly larger than the clearance between external thread 16 and the interior wall of barrel 13 to enable the pulverized material to be conveyed into fluidizing zone 4.

The process and apparatus of this invention have been described with emphasis on synthetic and natural polymer recycling. The same process and apparatus may also be used to enhance reactivity of polymeric and solid monomeric materials. Under the conditions of pressure and shear to form very fine powders, as described hereinabove, the coefficients of diffusion and mass transfer increase by several orders of magnitude and new properties are imparted to the material. Thus, at the moment of shear, reactions of polymerization, polycondensation, and/or polyaddition with formation of high molecular weight compounds takes place. The process for enhancement of reactivity of polymeric and solid monomeric materials is conducted by heating the thermoplastic material to a pre-melt temperature, cooling the material and applying sufficiently high normal and shear forces. Homopolymers, copolymers and new polymeric materials may be formed by use of the process and apparatus of this invention.

EXAMPLE I

Low density polyethylene of 55 melt flow index in granules of about 5 mm in size were fed to the first zone at the large end of a barrel housing a specially designed single screw (as shown in FIG. 2). The screw had a length of about 35 cm with an 0.05 mm clearance between the external thread and barrel, an 0.81 mm clearance between the internal thread and the barrel in the cooling/powderization zone, and higher clearance in the first and second zones, and was driven by a geared electric motor at 10 R.P.M. Torque was about 1.2 MKg. The temperature at a location close to the barrel wall in the heating zone, or zone 2, was maintained at 150° C. by electric heaters to heat the low density polyethylene to the temperature above its melting temperature of 118° C., although temperatures above melting are not the desired temperature in zone 2. However, in contrast to a twin screw extruder, no large agglomeration was produced. This shows superior performance of the single screw extruder. Cooling was provided to zone 3 by chilled water jackets surrounding the barrel housing to cool the polyethylene to a 90° C. at the barrel wall. Room temperature air at the end portion of zone 3 further cooled and fluidized the produced powders. The produced powder showed that more than 35 percent of particles have sizes less than 120 microns and about 85 percent of the particles have sizes below 420 microns. Neglecting less than 4 percent of the larger particles due to variation in control of process parameters, the produced particles have an average diameter of 235 microns.

EXAMPLE II

Low density polyethylene of 55 melt flow index, similar to EXAMPLE I, was pulverized using the same single screw extruder as in EXAMPLE I. Torque was about 3.6 MKg and the screw R.P.M. was 5. The temperature at the heating zone at a location close to the wall was 105° C., which is lower than the melting temperature of low density polyethylene, which is 118° C. Cooling was provided to zone 3 by chilled water jackets surrounding the barrel housing to cool the polyethylene to 90° C. at the barrel wall. About 94 percent of the powders produced had sizes smaller than 800 microns with more than 10 percent of the particles having particle sizes less than 70 microns, and more than 35 percent of the particles are less than 150 microns. Once again, the particle sizes obtained were much smaller than the twin screw extruder under similar operating conditions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for solid state shear extrusion pulverization of a polymeric material comprising:
   heating said polymeric material by heating means, then cooling said polymeric material;
   applying normal and shear forces sufficient to form powder of said polymeric material, said normal and shear forces applied by one of a cylindrical and a conical mesh single screw; and
   fluidizing said powder by application of a gas stream.

2. A process in accordance with claim 1, wherein said polymeric material is selected from the group consisting of thermoplastic polymers, thermosetting polymers, elastomers, rubber, natural polymers, and mixtures thereof.

3. A process in accordance with claim 2, wherein said polymeric material is a thermoplastic polymer.

4. A process in accordance with claim 3, wherein a pre-melt softening temperature of said thermoplastic polymer is about 3° C. to about 50° C. below the melting point of said thermoplastic polymer.

5. A process in accordance with claim 2, wherein said polymeric material is selected from the group consisting of polyethylene terphthalate, high-density polyethylene, low-density polyethylene, polypropylene, polyvinyl chloride, polystyrene, polyamides, polyurethanes, cross-linked polyethylene foams, and mixtures thereof.

6. A process in accordance with claim 1, wherein said polymeric material is heated to a temperature suitable for forming at least one continuous film of said polymeric material.

7. A process in accordance with claim 1, wherein said gas stream is at a lower temperature than said powder, thereby further cooling said powder.

8. A process in accordance with claim 1, wherein said polymeric material is heated to about 60° C. to about 300° C.

9. A process in accordance with claim 1, wherein said polymeric material is cooled to about 20° C. to about 100° C.

10. A process in accordance with claim 2, wherein said polymeric material comprises a mixture of thermoplastic and thermosetting materials.

11. A process in accordance with claim 10, wherein said powder comprises a substantial plurality of particles having a particle size below about 150 microns after a single pass of said polymeric material by said single screw.

12. An apparatus for solid state shear extrusion pulverization of polymeric materials comprising:
   a hollow elongated barrel having a material feed end and a powder discharge end and housing a single screw;
   feed means for feeding a polymeric material to a first zone at said feed end of said hollow elongated barrel;
   discharge means for discharging a pulverized powder from a fourth zone at the discharge end of said hollow elongated barrel;
   heating means for heating said polymeric material to a pre-melt or softening temperature below its melting temperature in a second zone adjacent said first zone;
   cooling means for cooling said polymeric material from said pre-melt or softening temperature to a lower temperature;
   means for applying normal and shear forces sufficient to form fine powder from said polymeric material in a third zone disposed between said second zone and said fourth zone; and
   means for fluidizing said powder in a gas stream in at least one of said third zone and said fourth zone, thereby preventing its agglomeration.

13. An apparatus for solid state shear extrusion pulverization in accordance with claim 12, wherein said screw comprises a first screw section having flight and mesh sizes suitable for conveyance of said polymeric material in said first zone into said third zone.

14. An apparatus for solid state shear extrusion pulverization in accordance with claim 13, wherein said screw comprises a second screw section in which said flights and mesh change places whereby said polymeric material on said flights is conveyed to said mesh and said polymeric material on said mesh is conveyed to said flights, said second screw section disposed in said third zone.

15. An apparatus for solid state shear extrusion pulverization in accordance with claim 13, wherein the distance between said mesh and said hollow elongated barrel is smaller in said third zone than in said first and second zones, said distance in said third zone being sufficiently small to cause frictional forces required for pulverization under higher shear forces and being greater than the distance between the flights of said screw and said hollow elongated barrel in said third zone.

16. An apparatus for solid state shear extrusion pulverization in accordance with claim 12, wherein the distance between said barrel housing and said screw in said fourth zone is increased to inhibit agglomeration of the pulverized powder.

17. An apparatus for solid state shear extrusion pulverization in accordance with claim 16, wherein the distance between the flights of said screw is increased in said fourth zone to inhibit agglomeration of said pulverized powder.

18. An apparatus for solid state shear extrusion pulverization in accordance with claim 12, wherein said heating means is capable of heating said polymeric material to about 70° to about 200° C.

19. An apparatus for solid state shear extrusion pulverization in accordance with claim 12, wherein said cooling means is capable of cooling said polymeric material to about 30° to about 100° C.

20. An apparatus for solid state shear extrusion pulverization in accordance with claim 12, wherein said screw extends for the full length of said hollow elongated barrel housing.

21. An apparatus for solid state shear extrusion pulverization in accordance with claim 12, wherein said screw and said hollow elongated barrel housing are each generally converging in the direction of said discharge end.

22. An apparatus for solid state shear extrusion pulverization in accordance with claim 21, wherein said screw comprises a first screw section having flight and mesh sizes suitable for conveyance of said polymeric material in said first and second zones into said third zone.

23. An apparatus for solid state shear extrusion pulverization in accordance with claim 22, wherein said screw comprises a second screw section in which said flights and mesh change places whereby said polymeric material on said flights is conveyed to said mesh and said polymeric material on said mesh is conveyed to said flights, said second screw section corresponding to said third zone.

24. An apparatus for solid state shear extrusion pulverization in accordance with claim 21, wherein the distance between said barrel housing and said screw in said fourth zone is increased to inhibit agglomeration of the pulverized powder.

25. An apparatus for solid state shear extrusion in accordance with claim 24, wherein the distance between the flights on said screw is increased in said fourth zone to inhibit agglomeration of said pulverized powder.

26. An apparatus for solid state shear extrusion pulverization in accordance with claim 12, wherein an interior surface of said hollow elongated barrel is roughened at least in said third zone.

* * * * *